INVENTORS
Antonio Pacciarini
& Dario Giletta

INVENTORS
Antonio Pacciarini
& Dario Giletta

BY Sterens, Davis, Miller & Mosher
ATTORNEYS

United States Patent Office 3,358,330
Patented Dec. 19, 1967

3,358,330
APPARATUS FOR PRODUCING THE TREAD BAND OF FLEXIBLE TREAD RINGS WHILE IN A PLASTIC STATE
Antonio Pacciarini and Dario Giletta, Milan, Italy, assignors to Pirelli S.p.A., Milan, Italy
Filed June 2, 1964, Ser. No. 371,898
Claims priority, application Italy, July 27, 1963, 15,741/63
15 Claims. (Cl. 18—17)

ABSTRACT OF THE DISCLOSURE

Apparatus for treating a flexible ring in a plastic state including an outer mold comprising a plurality of sectors which are radially displaced into engagement with the flexible ring after the latter has been engaged by a plurality of rigid arcuate segments comprising an inner ring. The initial engagement of the flexible ring by the segments occurs at a different plane than the initial engagement of the flexible ring by the sectors, and a temporary support is formed for the flexible ring during its initial engagement by the segments.

---

The present invention relates to an apparatus for printing an embossed pattern along the peripheral band, of one or more flexible rings in a plastic state and for the possible heat treatment of said rings, and more particularly relates to the manufacture and the retreading of separable tread rings for pneumatic tires which tread rings are provided with annular reinforcing structures.

As is known to those skilled in the art, in order to mold or vulcanize tread rings separately from the carcasses onto which they are ultimately applied, a ring of uncured rubber is prepared which has a width about equal to the width of the tread to be obtained. Then, the ring was inserted on a core in the form of a rigid, continuous ring of a circular cross section having an annular inner chamber for the circulation of a heated fluid. Next, the pattern was printed on the peripheral band of the rubber ring by means of a mold comprising circular sectors manually positioned around the ring to be treated and then pressed against its outer surface by means of a frusto-conical hollow body, also provided with a chamber for the circulation of a heating fluid, which was caused to slide along the frusto-conical outer surface of the mold by means of a piston. A heated fluid was then injected into the chamber of the core as well as that of the frusto-conical hollow body to cure the ring. Both the inner rigid core and the sectors of the mold were constantly maintained on the same plate.

In the arrangement described above, the insertion of the ring on the core gave rise to difficulties and consumed much time, both because the operator had to exert traction on the ring to bring its inner diameter to a value greater than that of the outer diameter of the core, and because the rubber, by coming into contact with the outer surface of the core while still very hot from the prior vulcanization step tended to adhere to said surface, thus affecting the insertion of the ring on the core. What is more, the operator was likely to be burned by contact with the mold sectors during the manual positioning step and by contact with the core during the insertion and the removal of the ring to be treated.

Moreover, the prior arrangement, would not permit the treatment of rings having an inextensible reinforcing structure, since such rings, even temporarily, are unable to assume a diameter greater than the building up diameter of the carrying carcass.

A primary object of the present invention is to provide a new apparatus for printing an embossed pattern along the peripheral band, while in a plastic state, of one or more flexible rings disposed side-by-side and connected to one another, wherein a circular shape is imparted to the ring to be treated by maintaining its development constant and keeping its inner face in contact with a rigid, continuous cylindrical member of circular cross section, having an outer diameter corresponding to the inner diameter of the ring and divisible in at least two parts. Then, the flexible ring is compressed radially from the outside to the inside with at least two rigid arcuate members each provided on the surface adjacent the ring with radial projections corresponding to the cavities to be produced on the outer surface of the ring. To cure the already molded ring, the mold is surrounded with a heated fluid under high pressure.

Briefly summarized, the apparatus of the present invention comprises a collapsible ring, having a circular cross section and constituted by at least two circular rigid segments. A mold coaxial with the collapsible ring is utilized, this mold having at least two sectors each provided on their inner surface with radial projections corresponding to the cavities to be obtained on the peripheral band of the ring to be molded. Means for carrying out the retraction and the expansion of the collapsible ring are provided, together with means for displacing the mold sectors simultaneously and radially in both senses. The apparatus, moreover, comprises means for displacing the collapsible ring simultaneously or separately in vertical directions, at various levels, including the aforesaid means for carrying out its expansion and contraction and the radial displacement of the sectors constituting the mold. Furthermore, for curing the molded tread ring, there is provided a tight container to enclose the collapsible ring and the mold and to retain heated fluid under pressure.

The apparatus permits not only the treatment of a single tread ring, but also several rings, disposed side-by-side connected to one another, and which are separated after vulcanization.

The apparatus forming the object of the present invention has considerable advantages with respect to the one heretofore utilized. In fact, by adopting a collapsible core, it is possible to assemble around it rings having a correct development without the necessity of deforming them and of increasing their diameter. The importance of this detail appears more evident when it is considered that the rings of uncured rubber are in the plastic state and therefore their deformation is permanent.

A further advantage is represented by the possibility of treating rings in which substantially inextensible annular reinforcing structures are embedded.

Moreover, according to the apparatus of the present invention, both the insertion of the ring to be treated and its removal after the treatment may be carried out in an expeditious manner without any danger to the operator.

Furthermore, the fact that the centripetal approach of the mold sectors is mechanical and is carried out in a more regular manner than is allowed by a manual operation has a favorable influence on the accuracy of the printed pattern and therefore of the finished ring.

These and other features and advantages of the present invention will appear more clearly from the following description of a preferred embodiment of the invention, made with reference to the accompanying drawings, in which.

Figure 1:
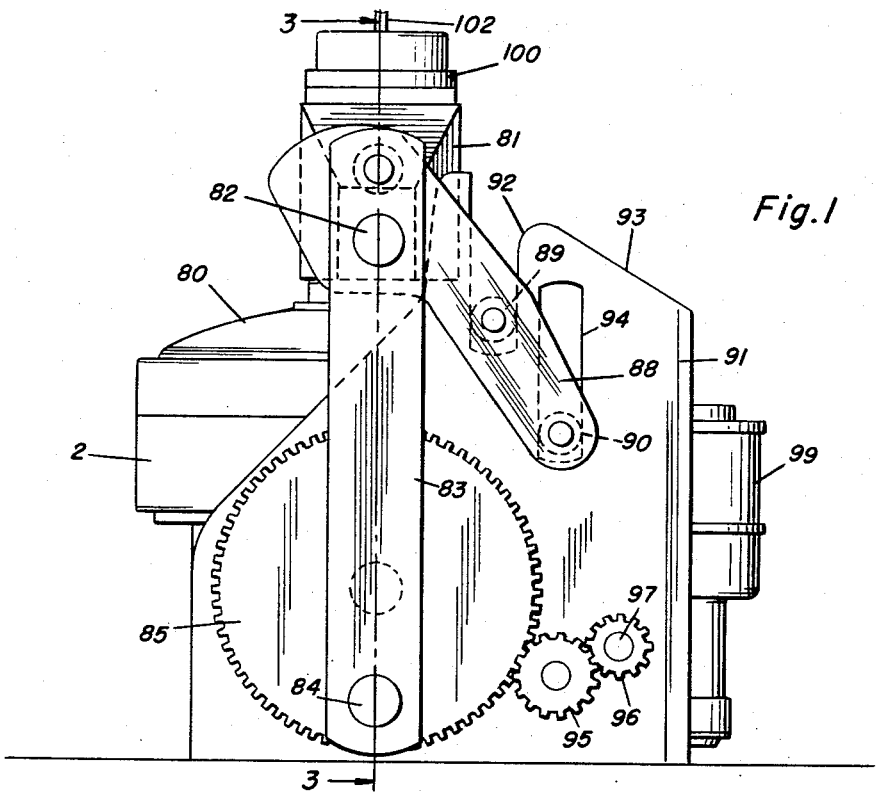
FIG. 1 is an end elevational view of the curing unit for pneumatic tire tread rings of the present invention.

The curing unit illustrated by the drawings embodies a frame 1 bearing a generally cylindrical container 2 which is provided on the rear wall thereof with an opening 3 for the introduction and the discharge of compressed fluid necessary for curing the ring, and on its bottom with a central hole, through which a cylinder 4 extends downwardly. In the cylinder 4 there are slidably mounted a piston 5 with its corresponding hollow stem 6 and a piston 7 with its corresponding hollow stem 8. Hollow stem 8, through the piston 5, passes inside the hollow stem 6. Integral with the lower end of the cylinder 4, and inside the hollow stem 8, there is assembled a tube 9, the lower end of which is connected, through a port 10, to a source of water under pressure. The lower end of the cylinder 4 is also provided with a second port 11 for the injection and the discharge of water under pressure below the piston 7. Disposed adjacent the lower end of the stem 8 there is a port 12, which communicates the interspace existing between the tube 9 and the stem 8 with the space existing between the pistons 5 and 7.

The upper end of the cylinder 4 carries a circular plate 13, which supports a mold constituted by a plurality of circular sectors 14. Each of these sectors, on its inner surface, is provided with protuberances corresponding to the cavities to be produced on the flexible ring 15 and is assembled on a support 16, provided with two lateral guides 17 and having an inclined plane 18 positioned between these guides. A second inclined plane 19, integral with the frame 1 through a supporting ring 20, is provided between each pair of guides 17 and disposed in operative engagement with each inclined plane 18.

The stem 6 carries at its upper end a ring 21 from which two spokes 22 and 23, intended to support a ring 24 integral therewith, project upwardly.

The ring 24 in turn supports a collapsible ring constituted by four circular sectors 25, 26, 27 and 28, of equal size two by two and each being provided with an upper and a lower undercut upon its outer face.

The sectors 25 and 26 have on their inner face two pairs of ears 29–30, 31–32, in which pins 33–34, 35–36, are respectively threaded. In the central part of these pins, one end of links 37, 38, 39 and 40 is respectively pivoted. The opposite end of links 37, 38, 39 and 40 is respectively pivoted on the pins 41, 42, 43 and 44 which are threaded in the block 45, supported by an annular ledge 46 provided outside the stem 8.

The segments 27 and 28 of the collapsible ring, supported by the ring 24, have on their inner face eight pairs of ears, disposed four by four in two different horizontal planes. In the upper plane are disposed pairs of ears 47, 48, 49 and 50, and in the lower plane lie pairs of ears 51 and 52 (and two other pairs which do not appear from the figures, but which are parallel to those of the upper plane). In the pairs of ears 47 and 48 there is threaded a pin 53, into which is pivoted an I-shaped element 54, pivoted at its opposite end in a pin 55 threaded in block 45. In the pairs of ears 49 and 50 there is threaded a pin 56, into which is pivoted an I-shaped element 57, pivoted at its opposite end in a pin 58 threaded in the block 45.

Similarly, in a plane lower than that of the pairs of ears 47, 48, 49 and 50, at the ends of pins 59 and 60, 61 and 62 are respectively pivoted links 63 and 64 (and two other links which do not appear in the figures).

On the bottom of the cylinder 4 there are slidably assembled two shoes 65 and 66 passed through by a pin 67 upon which is pivoted the end of a lever 68. The opposite end of lever 68 is keyed on a shaft 69 rotatably assembled in the frame 1.

At the opposite sides of the lever 68 and symmetrically with respect to it, on the frame 1, there are pivoted two cylinders 70 and 71 into which slide two pistons, the stems 72 and 73 of which are each pivoted at one end of the corresponding levers 74, while the opposite ends of the levers 74 are keyed on the shaft 69.

In the central part of shaft 69 there is keyed a lever 75 which, at its upper end, carries a screw 76. Screw 76 during the introduction of the ring 15 in the curing unit, is in contact with the stem 77, connected to the piston slidable in single-acting cylinder 78, which is provided with an opening 79 for the introduction and the discharge of compressed fluid.

The lid 80 of the container 2 is fastened to the lower part of a longitudinal beam 81 provided at opposite ends with a pin 82, supported in the upper end of a lever 83 pivotally connected at its opposite end to a pin 84 integral with a gear wheel 85 assembled in the supports 86 and 87 of the frame 1. On the opposed sides of the beam 81 there are fastened plates 88 into which are rotatably assembled rollers 89 and 90. And, on opposite sides of the frame 1 there are fastened, integral with it, two upright plates 91. Each of the latter plates is provided with a vertical guide 92 and an inclined guide 93, to permit sliding of the rollers 89, as well as a second vertical guide 94 to permit sliding of the rollers 90.

The gear wheels 85 are actuated in both directions, through the gears 95, which mesh with the pinions 96 keyed on the shaft 97 of the motor-speed reducer 98, by the reversing motor 99.

At the top of the beam 81 there is secured a cylinder 100, in which there is slidably assembled a piston 101. The top wall of the cylinder 100 is provided with a port 102 for the introduction and the discharge of compressed fluid. The stem 103 of a piston 101 carries at its lower end a hollow generally circular member 104, on the outer surface of which there is screw a plate 105 which in turn is provided on its lower surface with plates 106, disposed along a circumference, engageable with the sectors 14 and the supports 16 of the mold. Plate 105 is further provided with an adjusting ring 107, which engages on the inner surface of the collapsible ring to prevent any collapsing caused by the tendency of the tread ring to expand in consequence of the increase of temperature during the vulcanized operation. A corresponding adjusting ring 108 is provided integral with the circular plate 13.

In order to mold and vulcanize a tread ring, when the curing unit is loaded and completely closed, the lid 80 is raised by actuating a conventional source of power such as motor 99 which, through a motor-speed reducer and the gears 95 and 96, rotates gear wheels 85 so as to bring the pins or wheels 84 in a position corresponding to top dead center.

By virtue of the rotation of the wheels 84, the crank mechanism constituted by the levers 83 and the beam 81 initially raises the lid 80, maintaining it in a state of parallelism, and then rotates it about the pins 82 to an angle less than 90°. These movements are caused by means of the rollers 89 and 90, which slide in the guides 92, 93 and 94.

The raising of the lid 80 releases the pressure on the sectors 14 and on the collapsible mold 25, 26, 27 and 28, so that the cylinder 4 is pushed upwardly by the pistons contained in the cylinders 70 and 71, which are connected with the source of compressed fluid.

Figure 2:
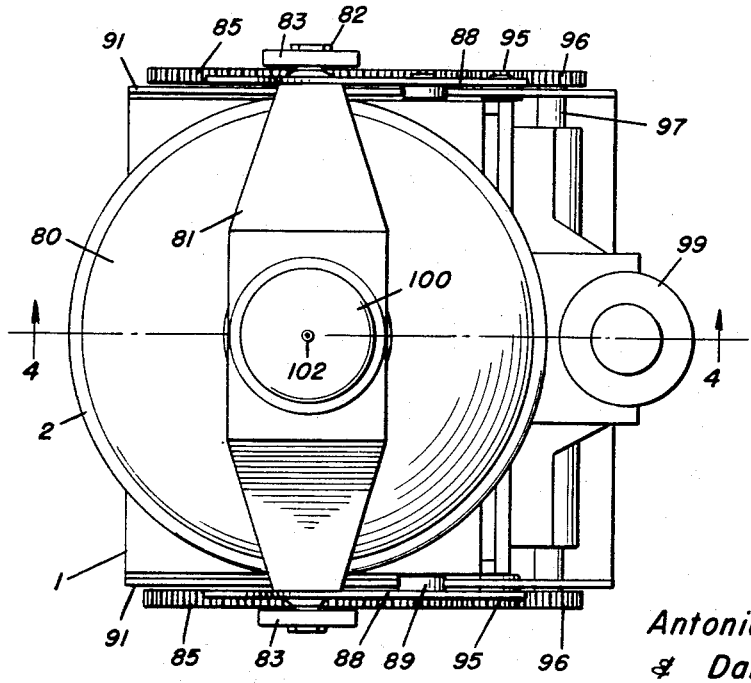
FIG. 2 is a top plan view of the curing unit shown in FIG. 1.
Figure 3:
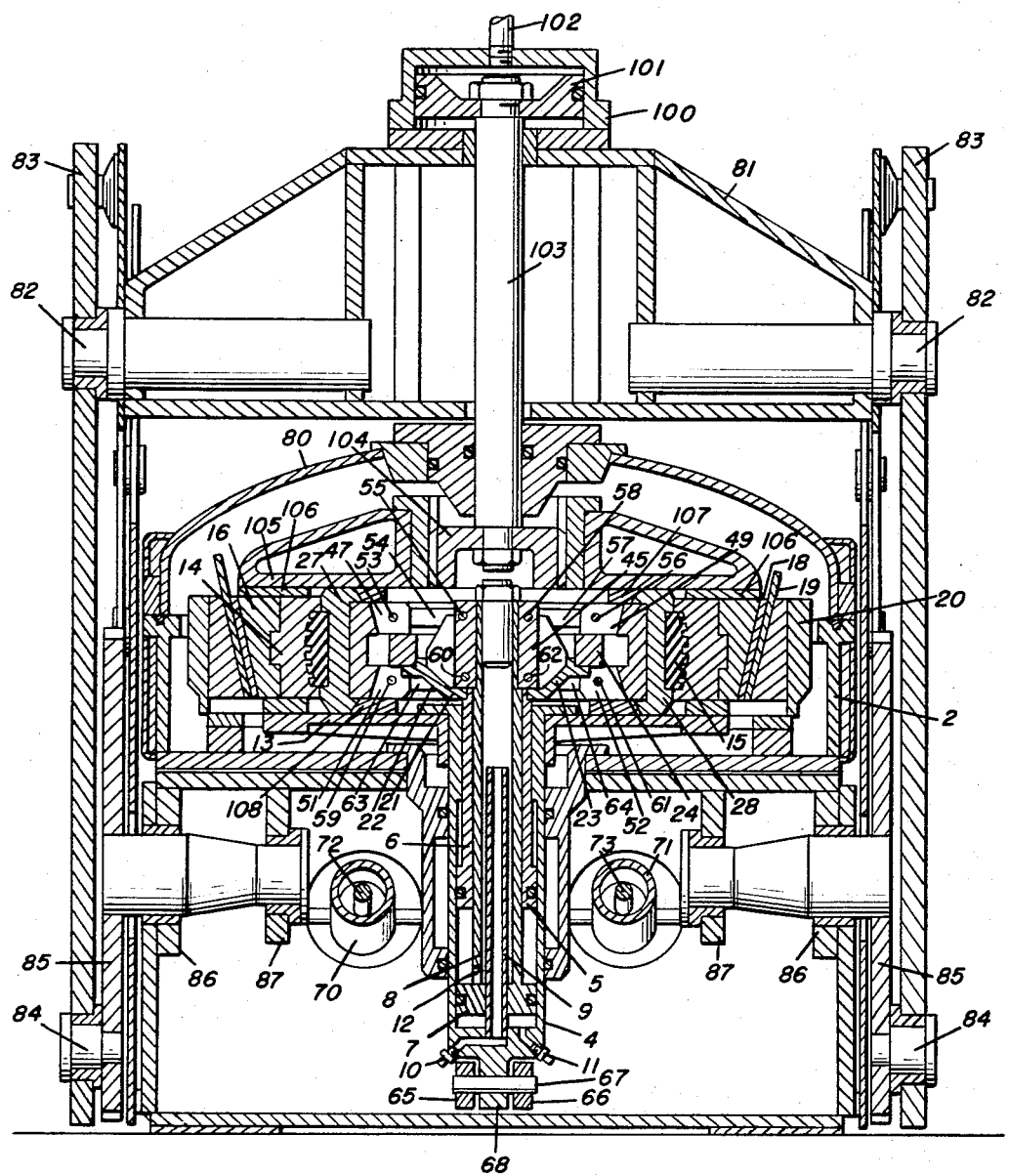
FIG. 3 is a longitudinal sectional view of the curing unit shown in FIG. 1.
Figure 4:
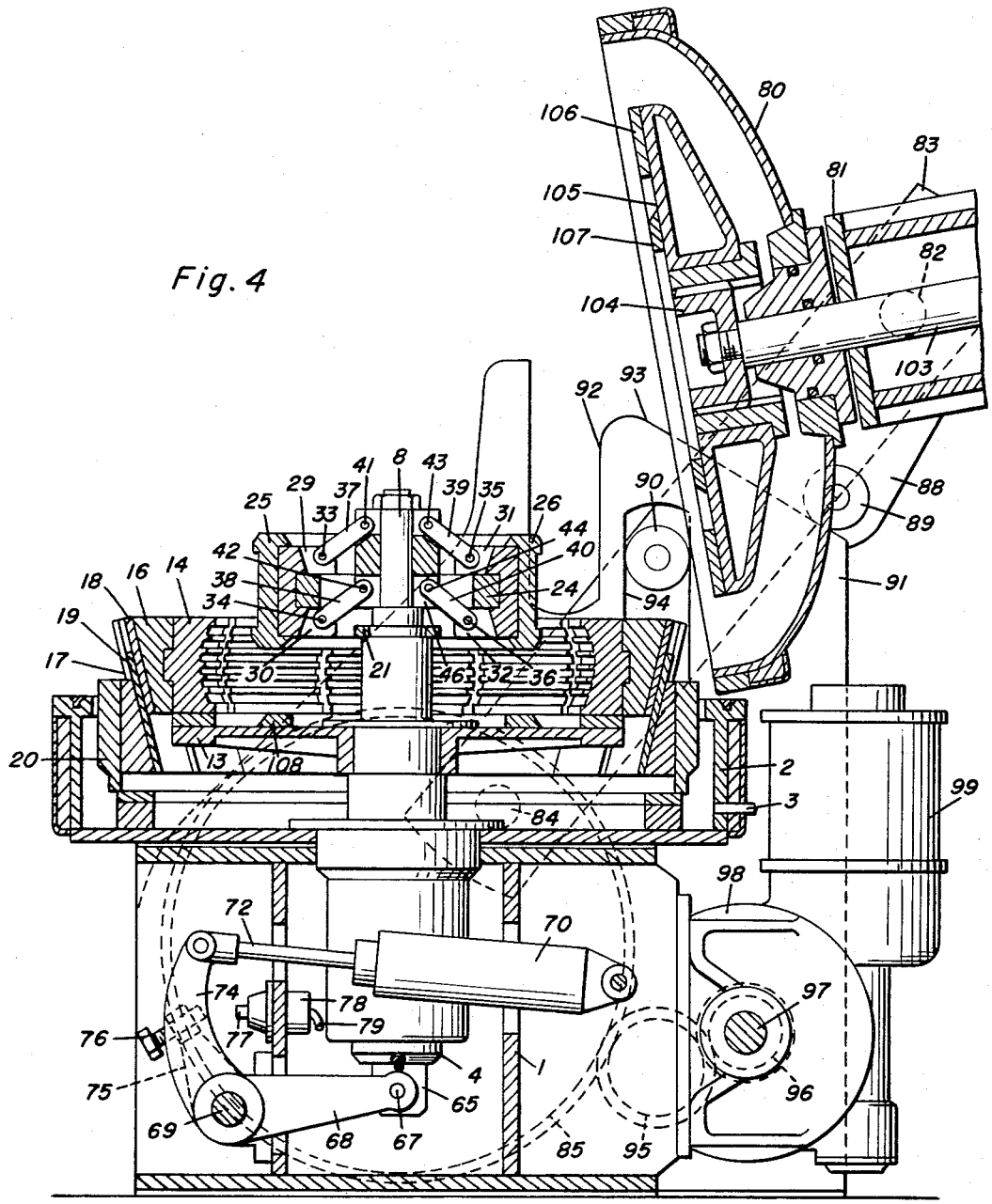
FIG. 4 is a cross section, of the curing unit in open positions taken on line 4—4 of FIG. 2.
Figure 5:
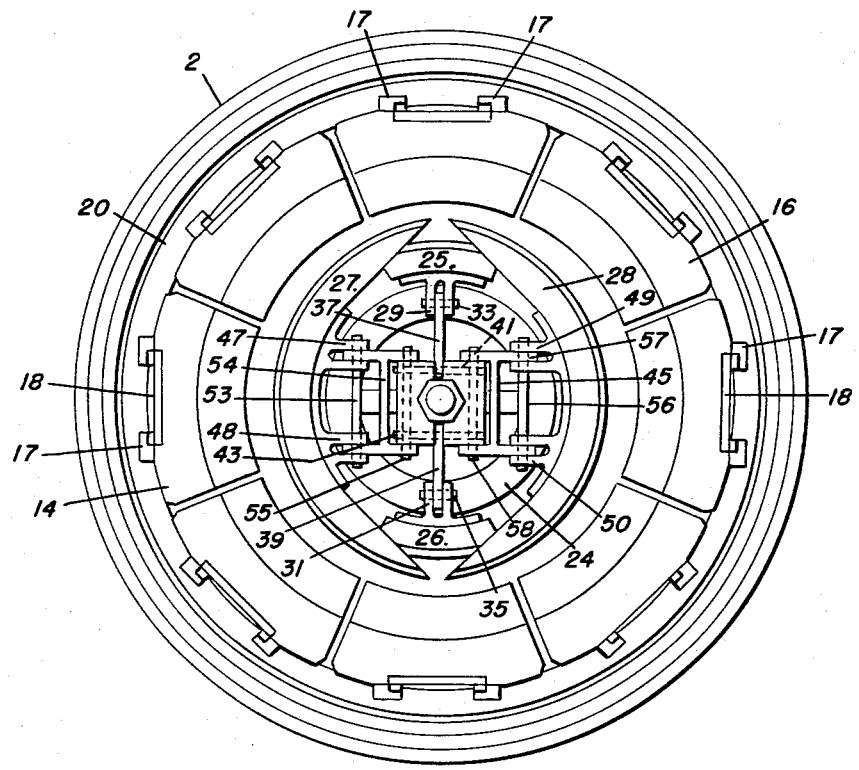
FIG. 5 is a top plan view of the curing unit with parts removed for illustrative purposes and showing the molding mechanism in one operative position.
Figure 6:
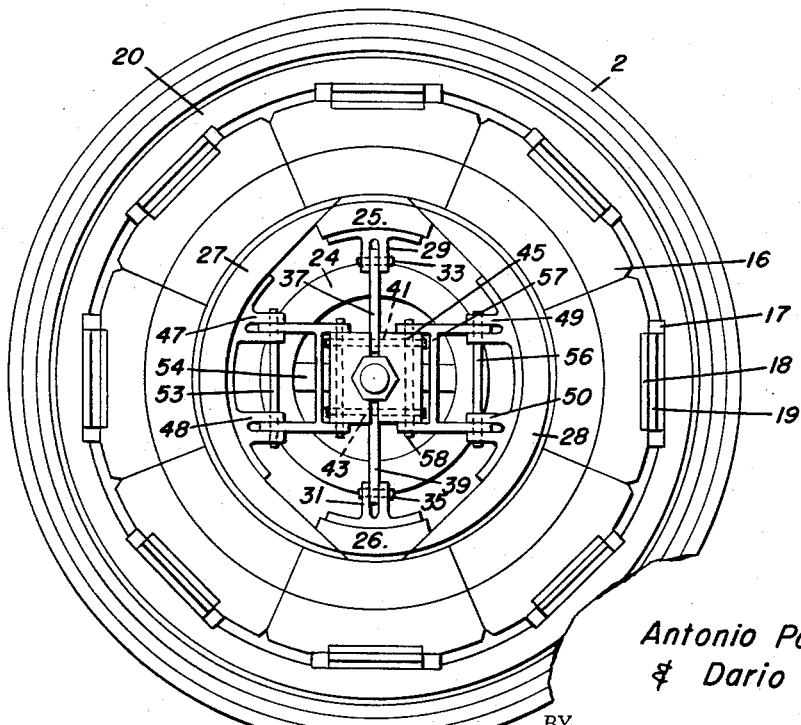
FIG. 6 is also a top plan view thereof with the molding mechanism in another operative position.

As best shown in FIG. 2, the raising of the cylinder 4 causes upward displacement of the circular plate 13, as well as outward radial movement of the mold sectors 14 and, consequently, their mutual detachment.

When the curing unit is completely opened, water under pressure is injected under the piston 7 through the opening 11, and at the same time the port 10 is closed so that the water existing between the two pistons 5 and 7 may not flow therein. The water injected through the opening 11 pushes up the pistons 7 and 5 until the latter completes its stroke. At this moment the port 10 is opened so that the water existing between the pistons 5 and 7 may be discharged, through the port 12, the tube 9 and the port 10, and the piston 7 may come into contact with the lower surface of the piston 5. Then port 10 is closed. The approach of the piston 7 to the piston 5 operates the lifting of the block 45 and of the pins 41, 42, 43, 44 and 55, 58, 62 and 60 threaded into it. As a result the segments 25, 26, 27 and 28 are subjected to a centripetal displacement and the ring formed by them is caused to contract. Simultaneously, the vulcanized tread ring 15 is freed from the undercuts of the collapsible ring into which it was inserted and is removed from the curing unit.

In order to load a new ring, compressed fluid is injected into the cylinder 78, in order to push the stem 77 outwardly, and the cylinders 70 and 71 are discharged. The cylinder 4, the plate 13 and the elements supported by it are then displaced downwardly by gravity, thus causing the lever 75 to rotate about the shaft 69 until the block 76 comes into contact with the stem 77. The sectors 14 are radially displaced inwardly, but do not come into contact with one another and with the segments of the collapsed ring, as the stem 77 prevents cylinder 4 from reaching its lowermost position.

The upper surface of the sectors 14 constitutes a supporting plane for the ring 15 to be vulcanized, so that the latter cannot slide downwardly before expansion of the collapsible ring occurs.

Next, the ring 15 to be vulcanized is inserted on the collapsed ring 25, 26, 27 and 28 and the latter is expanded by the introduction of water between the pistons 5 and 7 through the port 10, which is reopened, and into the tube 9 to the opening 12. Then the cylinders 70 and 71 are again reconnected to the source of compressed water in order to again lift the cylinder 4 and to mutually detach the sectors 14 so that the ring 15 may be inserted between them.

By means of the motor 100 the gear wheels 85 are actuated to swing the circular lid 80 to an angle slightly less than 90° until its lower edge is substantially horizontal, and to lower the lid by maintaining the lid in a state of parallelism until the compressed fluid is discharged from the cylinder 79.

The lowering of the lid 80 causes engagement of the adjusting ring 107 on the inner face of the segments 25, 26, 27 and 28 of the collapsible ring, as well as engagement of the plate 105 on the upper surface of said segments, thus lowering the collapsible ring together with the piston 5. The lowering of the latter continues until the collapsible ring 25, 26, 27 and 28 contacts the circular plate 13 and the adjusting ring 107 engages on the inner surface of the collapsible ring, and causes discharge of a portion of the water existing between the pistons 5 and 7 through the opening 10. The lid 80, in its progressive displacement downwardly, engages the plates 105 on the upper surface of the sectors 14 and the corresponding portions of supports 16, and pushes the circular plate 13 downwardly together with all the elements supported by it and inasmuch as the cylinder 4 is integral with plate 13, at a pressure higher than that exerted by the fluid existing below the pistons of the cylinders 70 and 71 which control the axial displacement of the cylinder 4, the fluid is caused to return in the tube from which it came. The lowering of the plate 13 causes the inclined planes 18 to slide along the stationary inclined planes 19, thus bringing about the radially inward movement of the sectors 14, whose projections penetrate in the surface of the ring 15, and completely closing the mold after discharge of the compressed fluid from the cylinder 78. At this stage the lid 80 contacts the upper edge of the container 2, closing off the mold from the room atmosphere, and the block 75 comes into contact with the cylinder 78. Then compressed fluid is introduced through the opening 102 to exert the desired pressure on the inner surface of the collapsible ring and on the upper surface of the sectors 14, while a corresponding counter-pressure is exerted by the adjusting ring 108 and by the plate 13 respectively on the lower part of the inner surface of the collapsible ring and on the lower surface of the molds by means of the cylinders 70 and 71.

Next, the tread ring 15 is vulcanized by delivering heated fluid under pressure through the opening 3. Following vulcanization, the fluid under pressure is discharged from the container 2, and the curing unit is reopened, as described above.

It will be obvious that other embodiments of the apparatus disclosed in this application may be utilized by those skilled in the art without departing from the scope of the invention as defined in the appended claims.

What is claimed is:

1. Apparatus for treating a flexible ring in a plastic state, said apparatus comprising a collapsible inner ring having at least two rigid arcuate segments, means to simultaneously radially displace said segments in the same plane into and from a position engaging the inner surface of said flexible ring, a circular outer mold coaxial with said inner ring, said outer mold having at least two sectors each having radial projections on its inner surface, means to radially displace said sectors into engagement with said flexible ring after said ring has been engaged by said segments to completely enclose said flexible ring, the initial engagement of said flexible ring by said segments being at a different plane than the initial engagement of said flexible ring by said sectors, and means forming a temporary support for said flexible ring during its initial engagement by said segments.

2. An apparatus as in claim 1, further comprising means to cause vertical displacement of said collapsible ring independently of said mold.

3. Apparatus as in claim 1 wherein said means to displace said segments is actuable independently of the vertical position of said collapsible ring.

4. Apparatus as in claim 1, further comprising means to cause simultaneous vertical displacement of said collapsible ring and of said mold.

5. Apparatus as in claim 1, wherein said means to displace said sectors is adapted to displace said sectors outwardly out of engagement with said flexible ring.

6. Apparatus as in claim 1, wherein said sectors are displaced simultaneously.

7. Apparatus as in claim 1, wherein said means to displace said sectors comprises a support for each sector integral therewith along one face and provided on the opposite face with an inclined plane cooperating with a second inclined plane, and means to control relative sliding movement between said inclined planes.

8. Apparatus as in claim 7, wherein each support is provided with guide means into which is inserted said second inclined plane for cooperating with the plane of said support.

9. Apparatus as in claim 1, wherein said means to displace said segments comprises a system of articulated rods, a central block having a plurality of pins threaded therein, one end of each of said rods being pivoted in said segments and the other in said pins, and means to vertically displace said block.

10. Apparatus as in claim 1, further comprising means for limiting centripetal displacement of said sectors of the mold in order that said sectors may remain slightly spaced from one another.

11. Apparatus as in claim 1, further comprising a container having a hermetic lid and provided with an opening for the introduction and the discharge of heated fluid under pressure, said container being adapted to contain said collapsible ring and said mold during heat treatment of the ring to be treated.

12. Apparatus as in claim 1, further comprising means for the automatic lifting and lowering of said lid.

13. Apparatus as in claim 1, further comprising two adjusting rings to respectively engage, in the upper and lower position, on the inner surface of the expanded collapsible ring, and means for pushing said adjusting rings against said surface.

14. Apparatus as in claim 1, further comprising plates to engage on the upper surfaces of said mold sectors, and means to push said plates on said sectors.

15. Apparatus as in claim 1, wherein said means forming said temporary support comprise said sectors.

References Cited

UNITED STATES PATENTS

| | | | |
|---|---|---|---|
| 1,260,990 | 3/1918 | Doughty | 18—17 |
| 1,388,255 | 8/1921 | Hardeman | 18—17 |
| 2,330,762 | 9/1943 | Tooker | 18—2 |
| 2,567,985 | 9/1951 | Baker et al. | 18—18 |
| 2,728,105 | 12/1955 | Pacciarini | 18—17 |
| 2,880,458 | 4/1959 | Frolich et al. | 18—17 |
| 3,065,499 | 11/1962 | Brundage et al. | 18—2 |
| 3,082,480 | 3/1963 | Ballé | 18—42 |
| 3,097,394 | 7/1963 | Mallory et al. | 18—17 |
| 3,121,947 | 2/1964 | Knox | 18—17 |
| 100,585 | 3/1870 | Balding | 249—180 |
| 718,700 | 1/1903 | Crosby et al. | 249—181 |

FOREIGN PATENTS

| | | |
|---|---|---|
| 619,870 | 2/1963 | Belgium. |
| 1,328,194 | 4/1963 | France. |
| 177,006 | 3/1922 | Great Britain. |
| 491,474 | 7/1938 | Great Britain. |

WILLIAM J. STEPHENSON, *Primary Examiner.*

J. HOWARD FLINT, *Examiner.*